(12) United States Patent
Johnson

(10) Patent No.: US 8,242,324 B2
(45) Date of Patent: Aug. 14, 2012

(54) REMOVAL OF HG, $NO_x$, AND $SO_x$ WITH USING OXIDANTS AND STAGED GAS/LIQUID CONTACT

(75) Inventor: Dennis W. Johnson, Barberton, OH (US)

(73) Assignee: Airborne International Holdings LLC, Washington, DC (US)

( * ) Notice: Subject to any disclaimer, the term of this patent is extended or adjusted under 35 U.S.C. 154(b) by 415 days.

(21) Appl. No.: 12/606,834

(22) Filed: Oct. 27, 2009

(65) Prior Publication Data

US 2010/0068110 A1 Mar. 18, 2010

Related U.S. Application Data

(63) Continuation-in-part of application No. 10/260,465, filed on Oct. 1, 2002, now abandoned.

(51) Int. Cl.
*B09B 1/00* (2006.01)
(52) U.S. Cl. .................... 588/403; 423/244.01
(58) Field of Classification Search ............. 588/249, 588/403; 423/239.1, 243.01, 243.08, 244.01, 423/244.07, 244.08
See application file for complete search history.

(56) References Cited

U.S. PATENT DOCUMENTS

| | | | |
|---|---|---|---|
| 4,116,881 A | 9/1978 | Shibata et al. | |
| 5,082,586 A | 1/1992 | Hooper | |
| 5,785,963 A | 7/1998 | Tseng | |
| 6,143,263 A | 11/2000 | Johnson et al. | |
| 6,214,308 B1 | 4/2001 | Keener et al. | |
| 6,303,083 B1 | 10/2001 | Johnson et al. | |
| 6,503,470 B1 | 1/2003 | Nolan et al. | |
| 2004/0062697 A1 | 4/2004 | Mortson et al. | |

FOREIGN PATENT DOCUMENTS

| | | |
|---|---|---|
| CA | 2456272 | 2/2002 |
| CA | 2418578 | 8/2003 |
| DE | 4315138 C1 | 7/1994 |
| DE | 19731162 A2 | 1/1999 |
| DE | 19850054 A1 | 5/2000 |
| EP | 1213046 A | 6/2002 |
| EP | 1524023 A | 4/2005 |

*Primary Examiner* — Edward Johnson
(74) *Attorney, Agent, or Firm* — Bobby W. Braxton; Colin P. Cahoon; Carstens & Cahoon, LLP

(57) ABSTRACT

A method of scrubbing mercury compounds and nitrogen oxides from a gas stream employing a scrubbing operation. The method involves the contact of the stream which contains mercury, $SO_x$ and $NO_x$ compounds with a sorbent to remove at least a portion of the latter compounds. This results in a partially cleaned stream. The method further involves contacting the latter stream with an oxidant to oxidize and remove substantially all residual nitrogen oxides, mercury and mercury compounds remaining in the stream.

23 Claims, 5 Drawing Sheets

REMOVAL OF HG, $NO_x$, AND $SO_x$ WITH USING OXIDANTS AND STAGED GAS/LIQUID CONTACT

CROSS-REFERENCE TO RELATED APPLICATIONS

This application is a divisional application that claims the benefit of and priority to U.S. patent application Ser. No. 11/081,612 filed Mar. 17, 2005, which is a continuation-in-part of U.S. patent application Ser. No. 10/260,465 filed Oct. 1, 2002 (now abandoned), the technical disclosures of which are hereby incorporated herein by reference.

TECHNICAL FIELD

The present invention relates to removal of $SO_x$ and $NO_x$ and mercury with oxidants, and more particularly, the present invention relates to removal of $SO_x$, $NO_x$, and Hg with staged gas/liquid contact.

BACKGROUND OF THE INVENTION

In the pollution control field, several approaches are used to remove sulfur oxides and other contaminants from a flue gas produced by the burning of a fossil fuel in order to comply with Federal and State emissions requirements. One approach involves locating and utilizing fossil fuels lower in sulfur content and/or other contaminants. A second approach involves removing or reducing the sulfur content and/or other contaminants in the fuel, prior to combustion, via mechanical and/or chemical processes. A major disadvantage to the second approach is the limited cost effectiveness of the mechanical and/or chemical processing required to achieve the mandated reduction levels of sulfur oxides and/or other contaminants.

By and large, the most widely used approaches to removing sulfur oxides and/or other contaminants from flue gas involve post-combustion clean up of the flue gas. Several methods have been developed to remove the $SO_2$ species from flue gases.

A first method for removing $SO_2$ from flue gas involves either mixing dry alkali material with the fuel prior to combustion, or injection of pulverized alkali material directly into the hot combustion gases to remove sulfur oxides and other contaminants via absorption or absorption followed by oxidation. Major disadvantages of this first method include: fouling of heat transfer surfaces (which then requires more frequent soot blowing of these heat transfer surfaces), low to moderate removal efficiencies, poor reagent utilization, and increased particulate loading in the combustion gases which may require additional conditioning (i.e. humidification or sulfur trioxide injection) of the gas if an electrostatic precipitator is used for downstream particulate collection.

A second method for removing $SO_2$ from flue gas, collectively referred to as wet chemical absorption processes and also known as wet scrubbing, involves "washing" the hot flue gases with an aqueous alkaline solution or slurry in a gas-liquid contact device to remove sulfur oxides and other contaminants. Major disadvantages associated with these wet scrubbing processes include: the loss of liquid both to the atmosphere (i.e. due to saturation of the flue gas and mist carry-over) and to the sludge produced in the process; and the economics associated with the construction materials for the absorber module itself and all related auxiliary downstream equipment (i.e., primary/secondary dewatering and waste water treatment subsystems). A typical wet scrubbing system is shown in FIG. 1.

A third method, collectively referred to as spray drying chemical absorption processes and also known as dry scrubbing, involves spraying an aqueous alkaline solution or slurry which has been finely atomized via mechanical, dual-fluid or rotary type atomizers, into the hot flue gases to remove sulfur oxides and other contaminants. Major disadvantages associated with these dry scrubbing processes include: moderate to high gas-side pressure drop across the spray dryer gas inlet distribution device, and limitations on the spray down temperature (i.e., the approach to flue gas saturation temperature) required to maintain controlled operations.

There are several methods for controlling $NO_x$ emissions. Selective Catalytic Reduction (SCR) is the most common method. In these processes, ammonia is injected and mixed with the flue gas at low to medium temperatures. The mixture then flows across a catalyst (often vanadium based over a stainless steel substrate) and the $N_x$ is reduced to $N_2$. The problems with SCR systems is the high initial cost, high cost of ammonia which is thermally or chemically decomposed, and the introduction of ammonia into the gas stream causing problems with the formation of ammonium bisulfate and ammonia slip the atmosphere. Selective Non-catalytic Reduction (SNCR) methods are also employed. In these processes ammonia or urea in injected into hot flue gases resulting with a direct reaction forming $N_2$. The problems with SNCR systems is the challenges with mixing and maintaining prober residence time and operating conditions for the reactions to take place optimally, sensitivity to changes in operating load, the high cost of ammonia which is thermally or chemically decomposed (even more than SCRs), and the introduction of ammonia into the gas stream causing problems with the formation of ammonium bisulfate and ammonia slip (as high as 50 ppm or higher) to the atmosphere.

$NO_x$ removal through injection of sodium bicarbonate ($NaHCO_3$) has been demonstrated by NaTec and others.

In the prior art for wet chemical $NO_x$ reduction, the use of oxidants such as hydrogen peroxide is employed. Hydrogen peroxide is an oxidizing agent for organic and inorganic chemical processing as well as semi-conductor, applications bleach for textiles and pulp, and a treatment for municipal and industrial waste. Hydrogen Peroxide ($H_2O_2$) is an effective means of scrubbing Nitrogen Oxides. It has been used for many years. The use of $H_2O_2$ and $HNO_3$ to scrub both NO and $NO_2$ is an attractive option because the combination handles widely varying rates of NO to $NO_2$, adds no contaminants to the scrubbing solution or blow-down/waste stream and allows a commercial product to be recovered from the process, i.e. nitric acid or ammonium nitrate.

Gas scrubbing is another common form of $NO_x$ treatment, with sodium hydroxide being the conventional scrubbing medium. However, the absorbed $NO_x$ is converted to nitrite and nitrate which may present wastewater disposal problems. Scrubbing solutions containing hydrogen peroxide are also effective at removing $NO_x$, and can afford benefits not available with NaOH. For example, $H_2O_2$ adds no contaminants to the scrubbing solution and so allows commercial products to be recovered from the process, e.g., nitric acid. In its simplest application, $H_2O_2$ and nitric acid are used to scrub both nitric oxide (NO) and nitrogen dioxide ($NO_2$)—the chief components of $NO_x$ from many utility and industrial sources.

There are several other processes which also use hydrogen peroxide to remove $NO_x$. The Kanto Denka process employs a scrubbing solution containing 0.2% hydrogen peroxide and 10% nitric acid while the Nikon process uses a 10% sodium hydroxide solution containing 3.5% hydrogen peroxide. A fourth process, the Ozawa process, scrubs $NO_x$ by spraying a hydrogen peroxide solution into the exhaust gas stream. The liquid is then separated from the gas stream, and the nitric acid formed is neutralized with potassium hydroxide. The excess potassium nitrate is crystallized out, and the solution reused after recharging with hydrogen. In addition to the methods cited above in which $NO_x$ is oxidized to nitric acid or nitrate salts, a series of Japanese patents describe processes and equipment for reducing $NO_x$ to nitrogen using hydrogen peroxide and ammonia.

Also worth mentioning is the fact that $H_2O_2$ is used for the measurement of Nitrogen Oxide in the Standard Reference Method 7 of the Code of Federal Regulations (CFR) promulgated test methods published in the Federal Register as final rules by the US Environmental Protection Agency (EPA). In this procedure, an $H_2O_2$ solution is used in a flask to effectively capture the $NO_x$. This, however is a slow reaction that requires several hours to complete.

There are two primary reasons that $H_2O_2$ has not gained widespread use as a reagent for removal of $NO_x$ in utility and large industrial applications. The first is that it is not a selective oxidant. Most of these sources also contain other species, primarily, $SO_2$ which are also effectively removed with hydrogen peroxide. Thus, a large quantity of $H_2O_2$ would be required compared to the amount of $NO_x$ removal sought. Even after a limestone scrubber, the amount of $SO_2$ present in flue gas may be equal to or greater than the amount of $NO_x$.

The second reason that $H_2O_2$ has not gained widespread use is the cost, especially when much more is required due to reactions with $SO_2$, for example, which can be better done prior to the $H_2O_2$ stage.

The overall reactions are:

$$3H_2O_2 + 2NO \rightarrow 2HNO_3 + 2H_2O \qquad 1)$$

$$H_2O_2 + 2NO_2 \rightarrow 2HNO_3 \qquad 2)$$

$$H_2O_2 + SO_2 \rightarrow H_2SO_4 \qquad 3)$$

Oxidation utilizing gases have been demonstrated in the art. It has been shown that over 90% of gas phase NO can be converted to $NO_2$ rapidly by $ClO_2$ at an applied rate of approximately 1.2 kg $ClO_2$/kg NO. This of course requires proper mixing conditions. $ClO_2$ is a much stronger oxidizer than hydrogen peroxide, sodium chlorate or sodium chlorite and would be a preferred oxidizer. Ozone is also a possibility, but has orders of magnitude greater capital costs relative to $ClO_2$ generators.

Sulfur dioxide reacts with chlorine dioxide in the gas phase to form sulfuric and hydrochloric acid.

$$2ClO_2 + 5SO_2 + 6H_2O \rightarrow 5H_2SO_4 + 2HCl \qquad 4)$$

Assuming $SO_2$ is the dominant species in the $ClO_2$ reaction in the presence of $SO_2$ and NO, then it is advisable, according to this invention, to add $ClO_2$ after having scrubbed out $SO_x$ to keep the economics of adding $ClO_2$ good.

A different process employs a proprietary oxidizing compound plus dilute sulfuric acid in a first stage and an irreversible process involving proprietary solutions and chemistries in a second stage. The system operates at greater than 99% efficiency on both NO and $NO_2$ and will accommodate ambient temperature gas streams.

The prior art also does not teach simultaneous removal of mercury and $NO_x$, especially elemental mercury ($Hg°$) removal. The prior art does teach limited capture of mercury using activated carbon and capture of oxidized mercury ($Hg^{+2}$ such as in the form of $HgCl_2$) (U.S. Pat. No. 6,503,470 to Nolan, et al.) in wet scrubbers that use an alkali reagent. This process also uses additives such as sodium hydrogen sulfide (NaHS) or other sulfides to chemically bind with the mercury to form compounds such as HgS.

SUMMARY OF THE INVENTION

One object of one embodiment of the present invention is to provide an improved method for scrubbing flue gas streams.

A further object of one embodiment of the present invention is to provide a method of scrubbing Hg compounds from a flue gas stream, comprising a scrubbing operation, including: contacting a flue gas stream containing Hg, $SO_x$ and $NO_x$ compounds with a sorbent for removing at least a portion of said $SO_x$, Hg and $NO_x$ compounds present in said stream to provide a partially cleaned flue gas stream; and contacting said partially cleaned flue gas stream with an oxidant to oxidize and capture substantially all residual Hg remaining in said stream.

Yet another object of one embodiment of the present invention is to provide a method of scrubbing $NO_x$ compounds from a flue gas stream containing said $NO_x$ compounds, a scrubbing operation, including: contacting a flue gas stream containing $SO_x$ and $NO_x$ compounds with a sorbent for removing at least a portion of said $SO_x$ and $NO_x$ compounds present in said stream to provide a partially cleaned flue gas stream; and contacting said partially cleaned flue gas stream with an oxidant to oxidize and capture substantially all residual $NO_x$ remaining in said stream.

A host of advantages are realized by practicing the methodology of the invention. One advantage is that a high removal of $SO_2$ and $NO_x$ (NO, $NO_2$, and dimers) is achieved with essentially all of the acid gas and air toxics (including $NO_x$) in the flue gas being removed. Particularly convenient is the fact that $NO_x$ is removed without the use of ammonia and no SCR (Selective Catalytic Reduction) system is required for NO removal. The methodology also results in the high removal of Hg without the use of expensive activated carbon systems; in the preferred embodiment, all emissions removal is accomplished in a single, staged tower.

It has been found that the oxidant will also effectively remove any $SO_2$ in the flue gas with the overall cost of this ultra high removal system being lower than a system with multiple vessels.

In terms of other features, less physical space is required than conventional multi-step processes which would employ separate vessels and much more equipment in the gas stream; the amount of oxidant required is reduced, since almost all the sulfur compounds and some of the $NO_x$ and Hg are removed prior to the oxidant stage.

The process permits many choices for reagents for $SO_2$ control in the first add-on stage with sodium alkalis being the preferred reagents due to gas phase reactions in the stage, production of sodium sulfate, the ability to regenerate the sodium alkali, and conveniently, carbon injection equipment is not required as Hg and other air toxics are removed by the staged process steps.

Further advantages include: each stage can be custom designed to meet the pollutant removal characteristics of the constituents removed in each individual stage; the chemistry of each stage is independently controlled and monitored to optimize the performance; each stage is isolated to prevent contamination of reagents/solutions; and the solutions in each stage are handled separately.

Having thus described the invention, reference will now be made to the accompanying drawings illustrating preferred embodiments.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
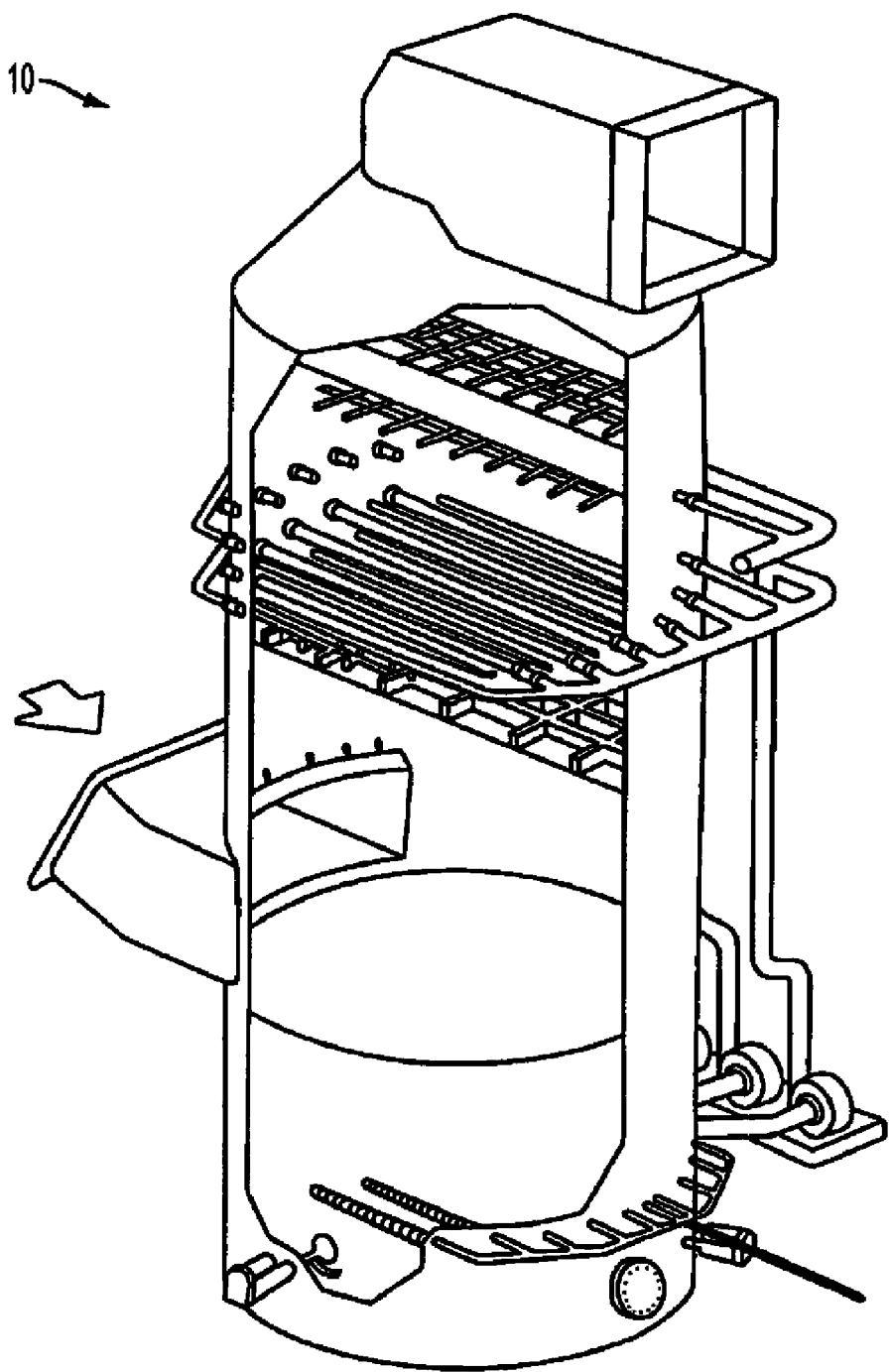
FIG. 1 is a prior art scrubber arrangement.
Figure 2:
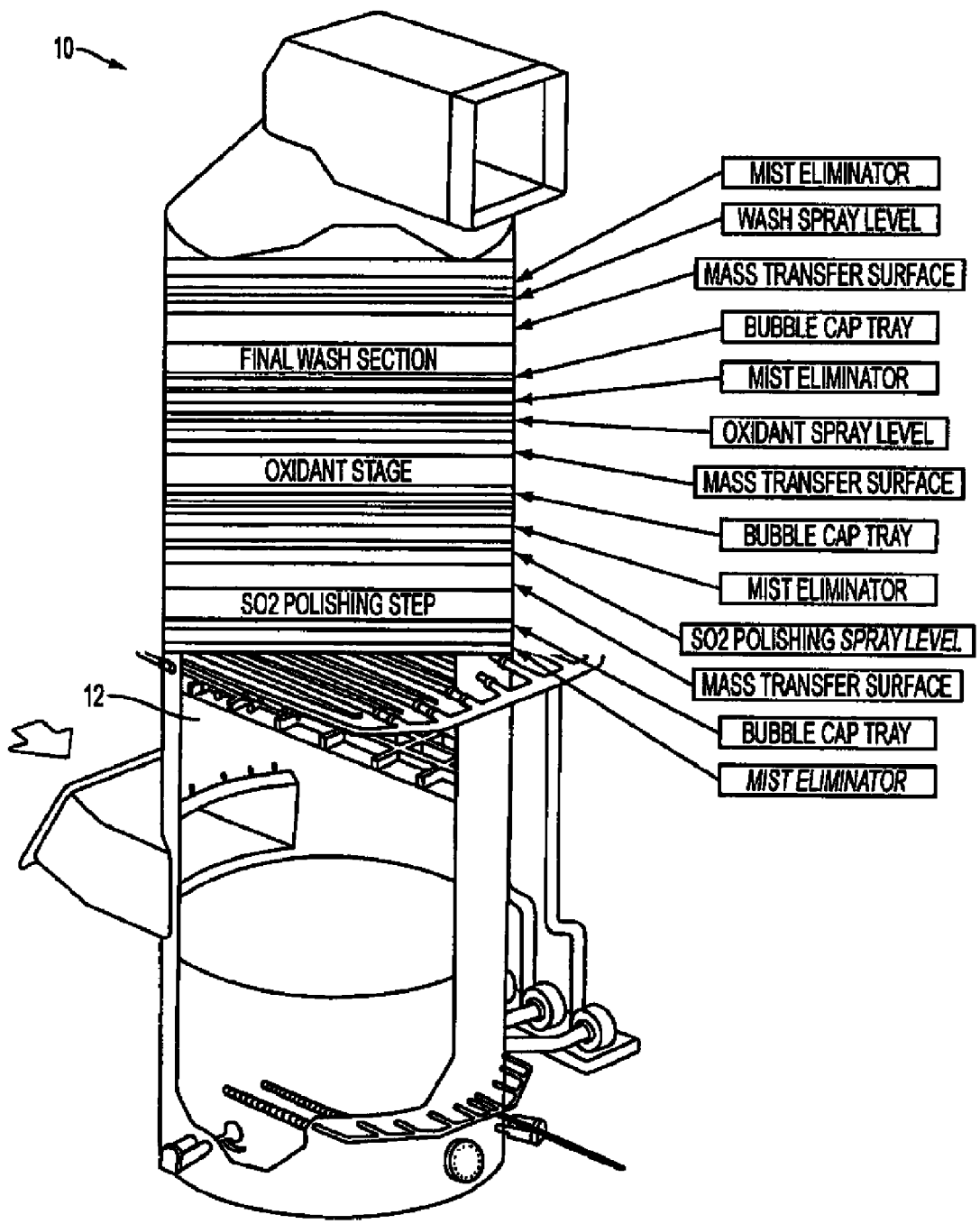
FIG. 2 is a scrubber arrangement according to the present invention.

Wet scrubbing systems such as that shown on FIG. 1 and globally denoted by numeral 10 use lime, limestone, soda ash, sodium, magnesium, and calcium or other compounds for scrubbing. They also can employ any of a number of additives to enhance removal, control chemistry, and reduce chemical scale. These systems are adequate at removing $SO_2$ up to maybe 90-98%, but do not effectively remove $NO_x$ or Hg.

In the combined system of the present invention, the flue gas is scrubbed by wet scrubbing using prior art technologies like that shown on FIG. 1 for partial removal of $SO_2$ (partial removal means less than 100% or typically 90-95% such as is known in the prior art for calcium based scrubbers).

Figure 3:
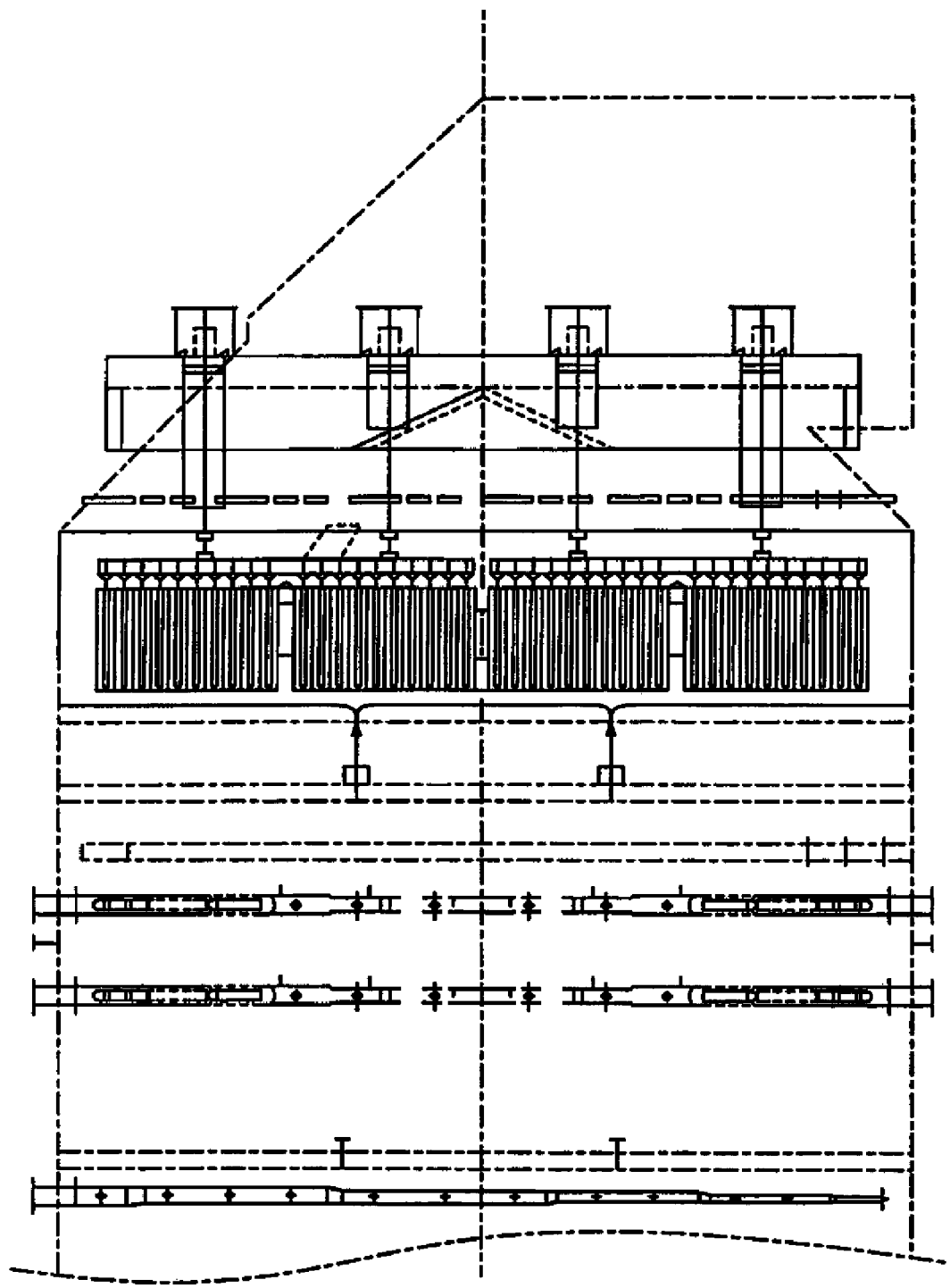
FIG. 3 is a prior scrubber arrangement incorporating a wet electrostatic precipitator (WESP) for the purpose of removing condensables, like $H_2SO_4$ which forms from $SO_3$ gas and water.

The gas could be, optionally, conditioned by injection of absorbents, reagents, or sorbents to reduce a portion of the inlet $SO_3$. Some sulfur dioxide, hydrochloric acid, $NO_x$ or other acid gases may also be removed by the injection. This can be by wet or dry injection with almost any alkali at any of several possible and known locations or temperature zones from the source of the flue gas to the scrubber inlet. However, dry sodium bicarbonate injection is preferred since it will react with the $SO_3$, $NO_x$ and $SO_2$ and other acid gasses including HCl, HF, $H_2S$, etc. in the gas stream. When injection of sorbents is employed, the need for a wet electrostatic precipitator such as that shown on FIG. 3 is eliminated. $H_2SO_4$ is not formed since $SO_3$ is effectively removed upstream of the wet scrubbing system.

Following the optional injection step, $SO_2$ and acidic $NO_x$ compounds such as $NO_2$, $N_2O_3$ and $N_2O_5$ and their associated dimmers, i.e. $N_2O_4$ are removed in the wet scrubber. In the prior art with sodium bicarbonate injection, the conversion of NO to $NO_2$ was considered undesirable since the $NO_2$ was a brown gas that was not captured by the downstream equipment. In this case, the wet scrubber effectively captures some of the $NO_2$, $N_2O_5$, etc. Some of the NO is captured directly by the sodium bicarbonate.

In the prior art, including U.S. Pat. No. 6,143,263 and U.S. Pat. No. 6,303,083, Method and System for $SO_2$ and $SO_3$ Control by Dry Sorbent/Reagent Injection, and Wet Scrubbing, there is no teaching for $NO_x$ removal in any form as the $NO_x$ is known to be primarily in the form of $NO_x$ which is not effectively captured with conventional based sorbents such as lime, limestone, or sodium.

The present invention is a one to three step add-on technology. This applies to all scrubbing systems for gases that contain $SO_2$, $NO_x$, and Hg such as from the combustion of coal or other industrial fuels or from chemical processes. This also applies to both new applications or modifications of existing units.

For the one stage add-on step, all or almost all $SO_2$ is removed by the prior art system such as a high efficiency scrubber that employs a reagent based on sodium, magnesium, buffered calcium, etc. High removal of $SO_2$ is not necessary, but is preferred. If the $SO_2$ removal is low, then it will be removed by the oxidant. This will require a significant quantity of a higher cost reactant.

For a 2-stage add-on step, the first a stage is added to effectively remove all or almost all of the remaining $SO_2$. This uses a tray like a bubble cap tray (not shown) or a separate vessel (not shown) to keep the $2^{nd}$-stage $SO_2$ reagent stream separate from the lower stage acid gas absorber stage. This is done preferably, using a soluble scrubbing solution such as a sodium or magnesium based reagent (hydroxide, carbonate, sulfite, bicarbonate, bisulfite, etc. and may include buffering agents, additives, organic acids, etc.) with the appropriate mass transfer surfaces including any combination of sprays, packing, trays, etc.

Therefore, for both cases, all or almost all of the $SO_2$ is removed prior to the oxidant stage.

In the oxidant stage, $NO_x$ (primarily in the form of NO, $NO_2$, or other dimers) and mercury (elemental and oxidized) are removed. Like the first stage of the 2-stage add-on step, this uses a tray like a bubble cap tray or a separate vessel (neither of which are shown) to keep the reagent, in this case an oxidant stream, separate from the lower stages. Mass transfer surfaces such as additional trays, sprays or packing are added as required. The result is that the gas leaving this stage is essentially free of all $SO_x$ and has at up to 90% or more of the mercury and $NO_x$ removed. This eliminates Hg, $SO_x$, and NO contamination in the final stage.

An optional add-on stage is used as a final wash. This would be used to make sure any byproduct from the oxidant such as chlorine gas, $NO_2$, etc. is washed from the flue gas. The final wash, if required, would be with water or an appropriate solution.

A preferred embodiment (see FIG. 4) therefore consists of 2 to 5 or more stages. In a five stage system, the first stage is a dry injection step. The second stage is the wet acid gas scrubber using conventional steps known in the art and denoted by numeral 12. The third stage is a polishing step to remove the remaining $SO_2$. The preferred embodiment of the third stage (first add-on stage) is a reaction zone that uses a sodium carbonate ($Na_2CO_3$), caustic soda (NaOH) or sodium bicarbonate ($NaHCO_3$) reactant. This would produce sodium sulfate by the following overall reactions:

$$2NaHCO_3 + SO_2 + \tfrac{1}{2}O_2 \rightarrow Na_2SO_4 + 2CO_2\uparrow + H_2O \quad\quad 5)$$

$$Na_2CO_3 + SO_2 + \tfrac{1}{2}O_2 \rightarrow Na_2SO_4 + CO_2\uparrow + H_2O \quad\quad 6)$$

$$2NaOH + SO_2 + \tfrac{1}{2}O_2 \rightarrow Na_2SO_4 + H_2O \quad\quad 7)$$

The sodium carbonate, caustic soda, or sodium bicarbonate (or other reactants) can be purchased. Sodium bicarbonate can be regenerated on site using the processes developed by Airborne Pollution Control. Caustic soda can be produced on site using electrochemical methods from sodium sulfate. In this case, sodium sulfate is split and reacted with ammonia to produce NaOH and $(NH_4)_2SO_4$. The NaOH is used in the scrubber and the $(NH_4)_2SO_4$ can be sold as a fertilizer.

The forth stage is the oxidant stage is used to remove $NO_x$ and/or mercury. One embodiment of the oxidant stage would be an integral reaction zone that recirculates an aqueous solution of oxidant and reaction products to effectively remove all the $NO_x$ and much of the mercury, simultaneously. No sulfur oxides would be removed in this step as they are effectively removed prior to the oxidant stage.

The fifth stage is the final wash.

Other embodiments would use 2, 3, 4, 5 or more stages depending upon the pollutants that will be removed and the operating conditions. For example, Stage 1 of the preferred embodiment, would not be required if $SO_3$ was not present, Stages 1 and 2 are not required if there is no $SO_x$ present, and Stage 5 is not required if species that require a final wash are not present. The oxidant would be selected depending upon the desired level of removal of $NO_x$ and/or Hg.

The following is a partial list of oxidants that are useful for capture of $NO_x$ and/or Hg or Hg compounds:

1) Hydrogen Peroxide
2) Hydrogen Peroxide/Nitric Acid Solution ($H_2O_2/HNO_3$)
3) Hydrogen Peroxide/Nitric Acid/Hydrochloric Acid Solution ($H_2O_2/HNO_3/HCl$)
4) Sodium Chlorate Solution ($NaClO_3$)
5) Sodium Chlorite Solution ($NaClO_2$)
6) Sodium Hypochlorite Solution ($NaClO_4$)
7) Sodium Perchlorite Solution ($NaClO_4$)
8) Chloric Acid Solution ($HClO_3$)
9) Oxone Solution (2 $KHSO_5$—$KHSO_4$—$K_2SO_4$ Triple Salt)
10) Potassium Chlorate Solution ($KClO_3$)
11) Potassium Chlorite Solution ($KClO_2$)
12) Potassium Hypochlorite Solution ($KClO$)
13) Potassium Perchlorite Solution ($KClO_4$)
14) Potassium Permanganate ($KMnO_4$)
15) Potassium Permanganate/Sodium Hydroxide Solution Other oxidants or combinations of oxidants are possible. Further, sodium carbonate and sodium bicarbonate or other alkalis can be substituted for the sodium hydroxide solutions used for pH adjustment and to provide the ions for complete reactions. Oxidants can be selected to remove just $NO_x$, remove just Hg or simultaneously remove both $NO_x$ and Hg. Additionally, gaseous oxidants such as ozone, $O_3$, or Chloride dioxide, $ClO_2$, can be injected into the gas that has had all or most of the $SO_2$ removed. With proper mixing and sufficient residence, the oxidation of NO or Hg in the gas phase by gaseous oxidants occurs. Gaseous oxidants are capable of oxidizing NO not only to $NO_2$ but also to $N_2O_5$ which rapidly reacts with water or alkaline solutions to form nitric acid or nitrates.

Bench-scale screening of potential solutions for capturing $NO_x$ and $Hg^\circ$ was performed using a simple gaseous mixture ($Hg^\circ+NO+NO_2+CO_2+H_2O+N_2+O_2$) and an impinger sampling train similar to that described in the American Society of Testing and Materials Method D6784-02 (Ontario Hydro method). Testing has identified solutions that effectively removed both $NO_x$ and $Hg^\circ$. The results are shown in the table below:

TABLE 1

Bench Scale Test Results

| Solution | $NO_x$ Removal or NO conversion to $NO_2$ | Hg Removal (Hg Total and $Hg^\circ$) |
|---|---|---|
| Hydrogen Peroxide | Low | Low |
| Nitric Acid (40%) + Hydrogen Peroxide | 30-40% | 30-40% |
| Acidified Potassium Permanganate | 30-40% | ~100% |
| Chloric Acid | Low | 30-40% |
| 0.1 M NaClO pH adjusted to 3.74 using HCl | ~100% | ~100% |
| 0.25 mole/L $KMnO_4$ + 2.5 mole/L NaOH (pH of 11.3) | ~98% (about 4 ppm passed through) | ~100% |
| 0.1 M NaClO, pH adjusted to 6 | 75-95% | ~100% |
| NaClO pH adjusted to 5 using HCl | ~70% | ~100% |

The results show that there are several possible solutions from which to choose. Even the situations that show medium removal ranges such as (Nitric Acid (40%)+Hydrogen Peroxide) or Acidified Potassium Permanganate will remove at higher rates with an appropriate modification to the mass transfer means. The oxidant selected, will then be based on economics, availability, desired level of capture, and/or desired end product.

Figure 4:
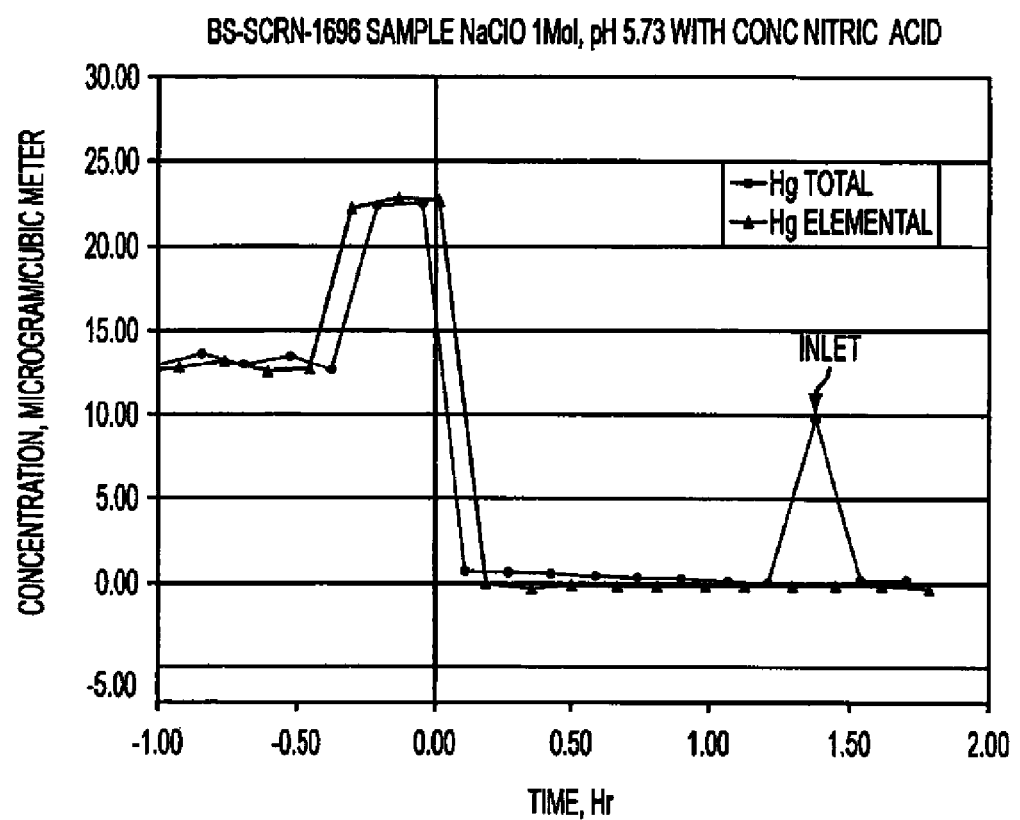
FIG. 4 is a graphical representation of data in accordance with the present invention.
Figure 5:
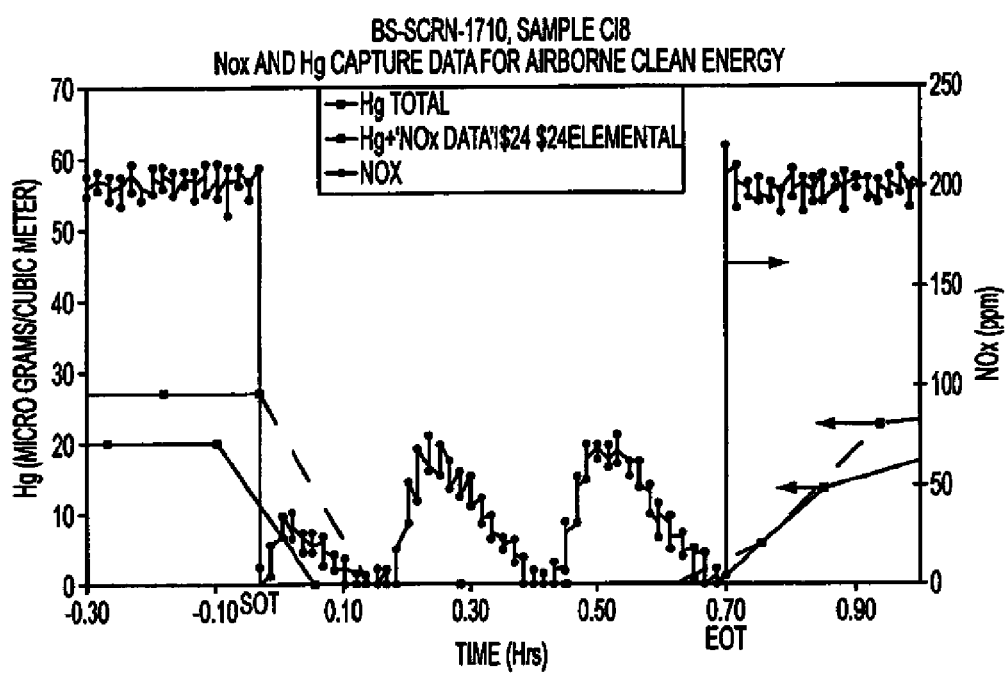
FIG. 5 is a further graphical representation of data in accordance with the present invention.

Further results are shown on FIGS. 3 and 4, with FIG. 3 illustrating mercury removal as a functioning time using NaClO at pH 5.73 and FIG. 4 illustrating mercury and $NO_x$ removal as a function of time using 0.1 M NaClO solution at pH 8. The proposed reactions with Sodium Hypochlorite (NaOCl) and $NO_x$ and Hg are:

$$2NO+3NaClO+2NaOH \rightarrow 2NaNO_3+3NaCl+H_2O \quad 8)$$

$$2NO+3NaClO+Na_2CO_3 \rightarrow 2NaNO_3+3NaCl+CO_2\uparrow \quad 9)$$

$$2NO+3NaClO+2NaHCO_3 \rightarrow 2NaNO_3+3NaCl+2CO_2\uparrow+H_2O \quad 10)$$

$$2NO_2+NaClO+2NaOH \rightarrow 2NaNO_3+NaCl+H_2O \quad 11)$$

$$2NO_2+NaClO+Na_2CO_3 \rightarrow 2NaNO_3+NaCl+CO_2\uparrow \quad 12)$$

$$2NO_2+NaClO+2NaHCO_3 \rightarrow 2NaNO_3+NaCl+2CO_2\uparrow+H_2O \quad 13)$$

$$2Hg+4NaClO+2H_2O \rightarrow 2HgCl_2+4NaOH+O_2 \quad 14)$$

In these reactions, an additional source of sodium such as bicarbonate, carbonate or hydroxide is provided to balance the reaction and in order to limit the potentially deleterious reaction of liberating $Cl_2$ gas. Thus the washing step would not be required. Sodium Chlorite ($NaClO_2$), Sodium Chlorate ($NaClO_3$) and Sodium Perchlorite ($NaClO_4$) can also be used for removal of $NO_x$ and Hg.

The products of the $NO_x$ reactions can be regenerated by the Airborne Process™ by the reactions:

$$NaNO_3+H_2O+NH_3+CO_2 \rightarrow NaHCO_3\downarrow+NH_4NO_3 \quad 15)$$

$$NaCl+H_2O+NH_3+CO_2 \rightarrow NaHCO_3\downarrow+NH_4Cl \quad 16)$$

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A method of scrubbing Hg compounds from a gas stream, comprising: a scrubbing operation, including:
   contacting a gas stream containing Hg or Hg compounds and $SO_x$ compounds with a sorbent for removing at least a portion of said $SO_x$, compounds present in said stream to provide a partially cleaned gas stream; and
   contacting said partially cleaned gas stream with an oxidant or oxidant solution to oxidize and/or remove residual Hg or Hg compounds remaining in said stream.

2. The method as set forth in claim 1, wherein said gas stream includes $NO_x$ compounds and a portion of the $NO_x$ compounds and/or a portion of the Hg or Hg compounds present in the gas are removed in said scrubbing operation.

3. The method as set forth in claim 1, wherein said partially cleaned gas stream is further contacted with a second sorbent selected from the group consisting of sodium bicarbonate, sodium carbonate, sodium hydroxide, calcium carbonate, calcium oxide, and calcium hydroxide, magnesium carbonate, magnesium oxide, magnesium hydroxide, buffering agents, additives, organic acids, or combinations thereof to remove substantially all remaining $SO_x$ compounds prior to said contacting with an oxidant or oxidant solution.

4. The method as set forth in claim 1, wherein substantially all of the residual Hg or Hg compounds are removed from said partially cleaned gas stream.

5. The method as set forth in claim 2, wherein said partially cleaned gas stream containing $NO_x$ compounds is further contacted with a second sorbent selected from the group consisting of sodium bicarbonate, sodium carbonate, sodium hydroxide, calcium carbonate, calcium oxide, and calcium hydroxide, magnesium carbonate, magnesium oxide, magnesium hydroxide, buffering agents, additives, organic acids, or combinations thereof to remove substantially all remaining $SO_x$ compounds prior to said contacting with an oxidant.

6. The method as set forth in claim 2, wherein contacting of said partially cleaned gas stream with an oxidant to remove residual Hg or Hg compounds remaining in said stream further removes at least a portion of $NO_x$ in said gas or converts all or part of the NO to $NO_2$.

7. The method as set forth in claim 6, including contacting said gas containing $NO_2$ with water or an aqueous alkali to remove said $NO_2$.

8. The method as set forth in claim 1, including contacting said gas with a final wash.

9. The method as set forth in claim 1, wherein said oxidant is selected from a group consisting of solutions of hydrogen peroxide, sodium chlorate, sodium chlorite, sodium hypochlorite, sodium perchlorite, chloric acid/sodium chlorate, chloric acid, potassium chlorate, potassium chlorite, potassium hypochlorite, potassium perchlorite, potassium permanganate, or a combination thereof or from a group of gaseous oxidants consisting of ozone, chlorine dioxide, or combination thereof.

10. The method as set forth in claim 2, wherein said oxidant is selected from a group consisting of solutions of hydrogen peroxide, sodium chlorate, sodium chlorite, sodium hypochlorite, sodium perchlorite, chloric acid/sodium chlorate, chloric acid, potassium chlorate, potassium chlorite, potassium hypochlorite, potassium perchlorite, potassium permanganate, or a combination thereof or from a group of gaseous oxidants consisting of ozone, chlorine dioxide, or combination thereof.

11. The method as set forth in claim 9, wherein said oxidant is in solution with an acid selected from the group consisting of nitric acid, hydrochloric acid and sulfuric acid.

12. The method as set forth in claim 9, wherein said oxidant is in solution with an alkali.

13. The method as set forth in claim 12, wherein said alkali is selected from a group including: caustic soda, sodium carbonate, or sodium bicarbonate.

14. The method as set forth in claim 9, wherein said oxidant includes chloride ions.

15. The method as set forth in claim 1, wherein said $SO_x$ compounds include SO2 or SO3.

16. The method as set forth in claim 2, wherein said $NO_x$ compounds include $NO_2$, $N_2O_3$, $N_2O_5$, $N_xO_y$, and dimmers thereof.

17. The method as set forth in claim 1, further including the step of recirculating unreacted sorbent for use in said scrubbing operation.

18. The method as set forth in claim 2, further including the step of recirculating unreacted sorbent for use in said scrubbing operation.

19. The method as set forth in claim 1, wherein said gas is conditioned by injection of sorbent to reduce a portion of the inlet $SO_3$.

20. The method as set forth in claim 2, wherein said gas is conditioned by injection of sorbent to reduce a portion of the inlet $SO_3$.

21. The method as set forth in claim 19, wherein at least some of said sulfur dioxide is removed and/or hydrochloric acid, $NO_x$ or other acid gases are removed by the said injection.

22. The method as set forth in claim 2, including contacting said gas with a final wash.

23. The method as set forth in claim 2, wherein said $SO_x$ compounds include $SO_2$ and $SO_3$.

* * * * *